May 30, 1961

P. ACTIS 2,985,901

DEVICE FOR BONDING SOLES TO FOOTWEAR

Filed Feb. 17, 1959

May 30, 1961 P. ACTIS 2,985,901
DEVICE FOR BONDING SOLES TO FOOTWEAR
Filed Feb. 17, 1959 5 Sheets-Sheet 2

May 30, 1961     P. ACTIS     2,985,901
DEVICE FOR BONDING SOLES TO FOOTWEAR
Filed Feb. 17, 1959     5 Sheets-Sheet 3

May 30, 1961  P. ACTIS  2,985,901
DEVICE FOR BONDING SOLES TO FOOTWEAR
Filed Feb. 17, 1959  5 Sheets-Sheet 4

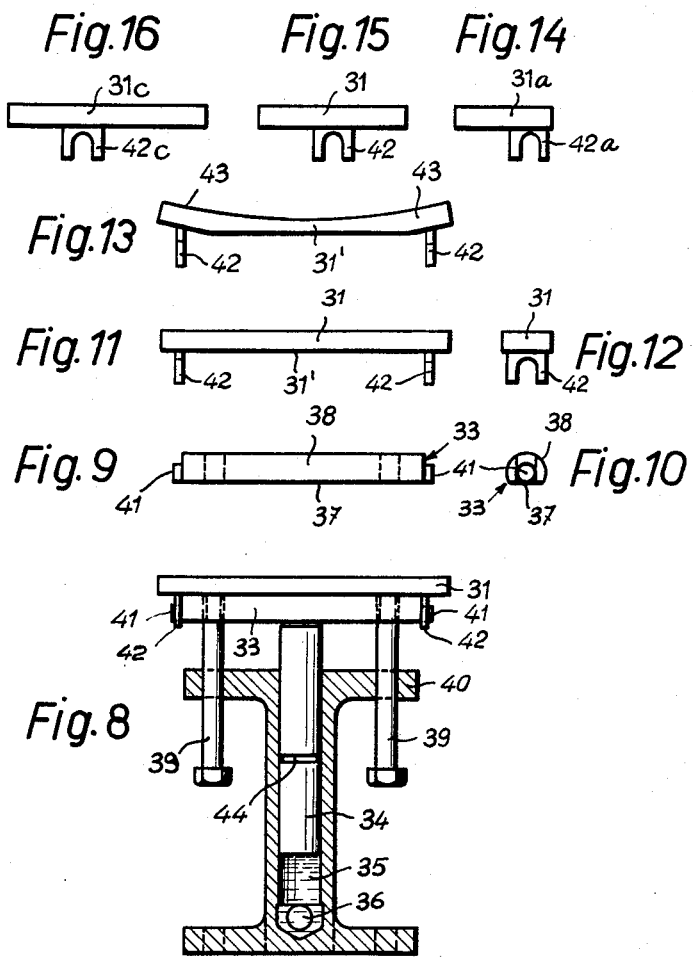

United States Patent Office 2,985,901
Patented May 30, 1961

2,985,901
DEVICE FOR BONDING SOLES TO FOOTWEAR

Paul Actis, 11 Rosengarten, Ospedaletti, Italy

Filed Feb. 17, 1959, Ser. No. 799,396

Claims priority, application France Feb. 24, 1958

7 Claims. (Cl. 12—38)

Known presses currently used for glueing or bonding footwear soles comprise a pad of resilient material carried by a piston adapted to compress the footwear and sole between the pad and stationary abutments in order to bond the sole to the footwear. Certain types of machine employ an inflatable pad. The latter evenly distribute pressure over the whole sole surface, which results in a satisfactory bond of the sole to the lower portion of the footwear. However, the sole and footwear subsequently undergo deformations owing to excessive pressures acting at the periphery of the pad.

Some known machines employ pads made of yieldable but not inflatable material. This avoids any risk of deformation of the sole and footwear; however, bonding of the sole to the lower portion of the footwear is locally unsatisfactory.

This invention avoids the above drawbacks by providing a device, wherein the member fulfilling the task of the abovementioned pad is made up of a plurality of parallel cross bars, each carried by at least one piston movable in a cylinder connecting with a conduit supplying pressure liquid, the conduit preferably serving all the cylinders.

The device may be employed alone and serve the purpose of the actual pad as well as of the piston or hydraulic jack currently employed for lifting the pad and pressing it against the sole to be bonded, or it may have associated therewith an independent piston or hydraulic jack. The former solution is useful in the manufacture of new equipments. The latter solution is useful for adapting an existing press for operation in association with the improved device.

In the former case the liquid pressure is set up by a mechanically or hand-operated pump, which is therefore capable of adjustment. In the latter case the cylinders in which the pistons supporting the bars are movable, connect with a common liquid reservoir.

In either case the number and profile of the bars are selected in accordance with the size of the footwear, each bar being conveniently made of metal or moulded plastics and being assembled for easy detachment, in order to quickly suit the device to various types of footwear. The bars can be carried by one only or a plurality of pistons as will be described in greater detail hereafter.

According to an embodiment of this invention each bar carries a central rod serving as a piston and two lateral retaining and guide rods expanding through a stationary support having bearing thereon two volute springs coiled about said lateral rods and bearing on the base of the latter, in order to constantly urge the bars downwardly, said support being moreover provided with two adjustable lateral abutments in order to stop the return motion of the bars at a position variable in accordance with the profile of the footwear sole.

The stationary support is formed by the top portion of a body having formed therein parallel cylinders arranged with vertical axis connecting at their lower end with a longitudinal conduit formed in the lower body portion, connecting in turn with a supply and back-flow conduit, respectively, for the liquid, said cylinders each enclosing the rod or piston carrying a bar and a cup-shaped seal adjacent the lower face of said piston pressed against said face by a spring bearing at the bottom of the longitudinal conduit. The cup-shaped seal can conveniently be replaced by one or a plurality of annular seals accommodated by annular grooves cut at various heights in the piston periphery.

The rod or piston carrying each bar can be made of one piece with said bar or it can be made separately and hinged to the bar for instance by means of a spherical joint. Further characteristic features and advantages of this invention will be clearly understood from the appended description referring by way of example to the accompanying diagrammatical drawings which shows some embodiments thereof.

Figure 4:
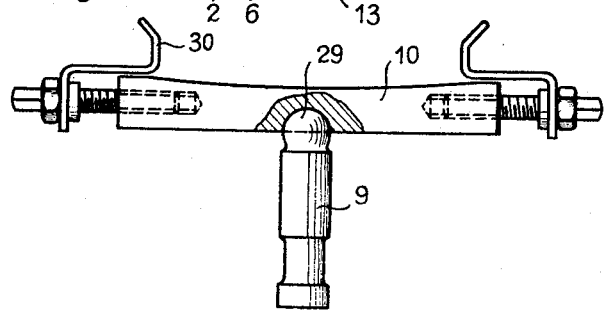
Figure 5:
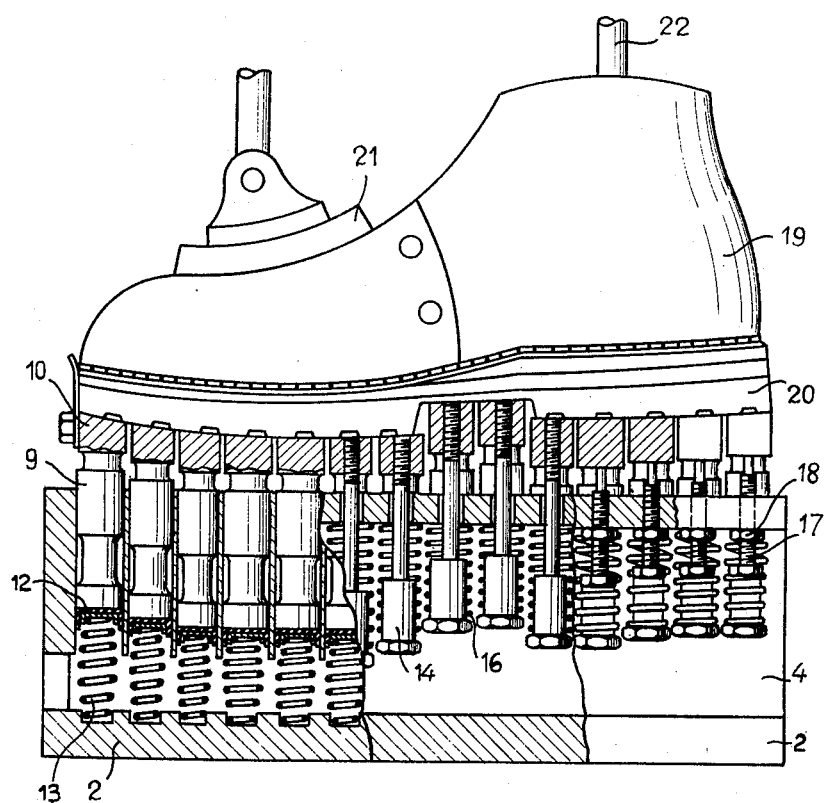
Figure 6:
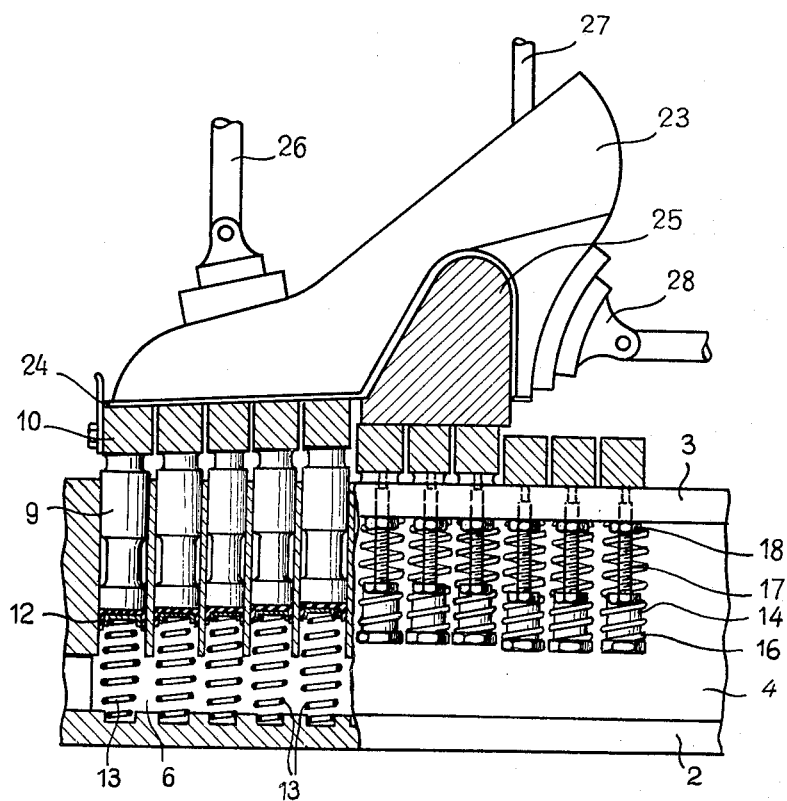
Figure 7:
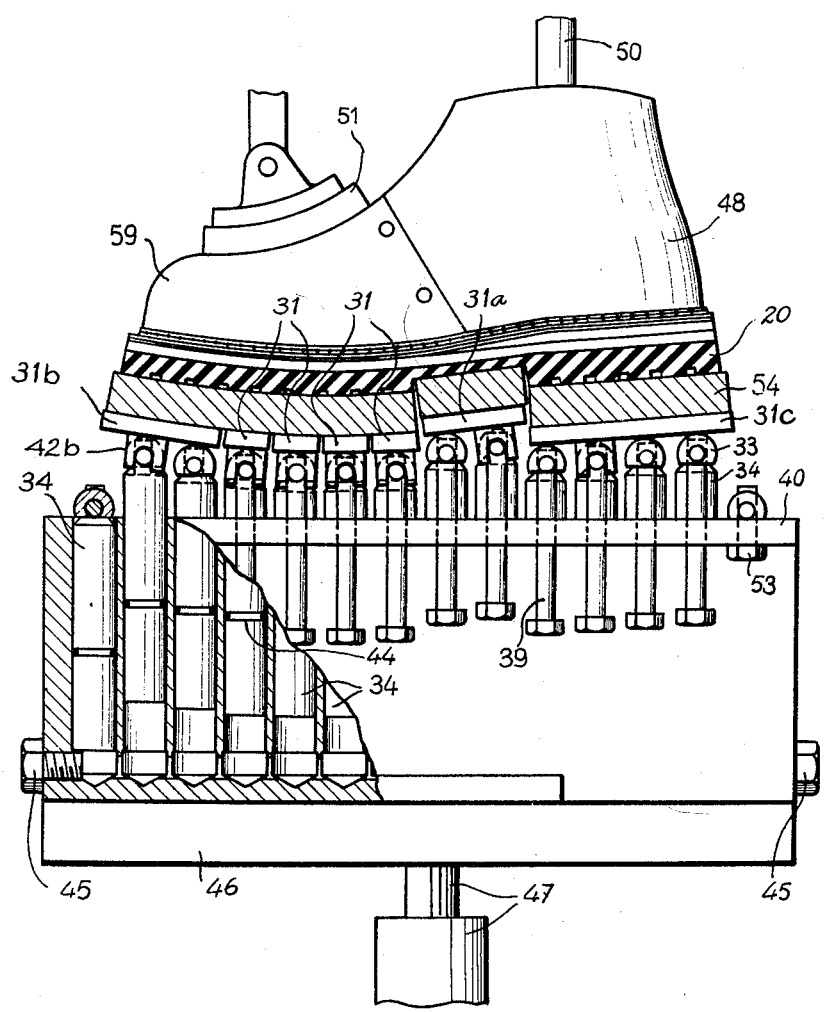

Figure 4 is a part sectional front-elevational view of a constructional detail of the device according to a modification thereof, Figure 5 is a side view of the device shown in the preceding figure in its assembled condition for bonding a sole to a man's shoe, Figure 6 is a view similar to Figure 5, in which the device is arranged to bond a sole to a woman's shoe, Figure 7 is a side view of a further embodiment arranged to bond a sole to a man's shoe, Figure 8 is a part cross-sectional view of the device shown in Fig. 7, Figures 9 and 10 are a front and side view, respectively, of a constructional detail of the device shown in Fig. 7, Figures 11 and 12 are a front and a side view, respectively, of a further constructional detail of the device shown in Fig. 7;

Figure 13 is a front view of a modification of the constructional detail shown in Figures 11 and 12, Figures 14, 15 and 16 are side views of three further embodiments of the constructional detail shown in Figures 11 and 12.

Figure 1:
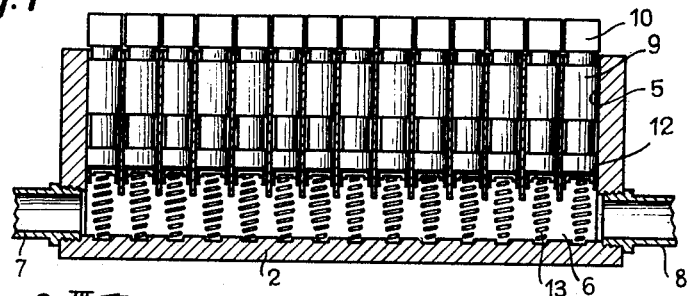
Figure 1 is a longitudinal sectional view of a first embodiment of the improved device.
Figure 2:
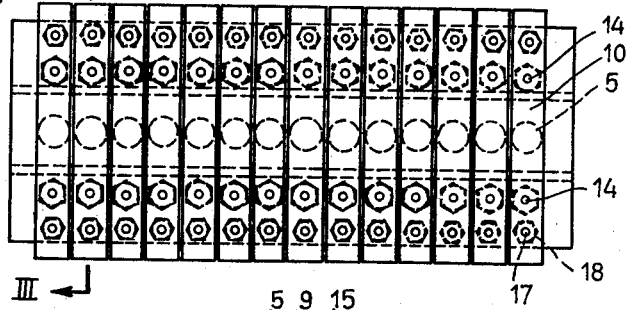
Figure 2 is a plan view thereof.
Figure 3:
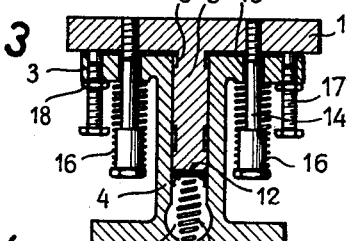
Figure 3 is a sectional view on line III—III of Figure 2.

The device shown in Figures 1 to 3 of the drawing comprises a body formed by two parallel cross-members 2 and 3 interconnected by a rib 4. A plurality of cylinders 5 are formed in the body beginning with the top cross member 3 and are arranged with a vertical axis, said cylinders opening into a common longitudinal conduit 6 bored approximately at the height of the lower cross member 2. The opposite ends of the conduit 6 connect through connecting pipes 7, 8, with oil supply and back-flow pipes connected in turn with the delivery and suction conduits, respectively of an oil pump (not shown).

A piston (9) is slidably mounted in each cylinder 5 and forms the stem for a bar 10, the piston and bar forming together a T-shaped body. A cup-shaped seal 12 and a spring 13, respectively, are interposed between the lower end of each piston 9 and bottom of the conduits 6, the spring 13 holding the seal 12 in contact with the lower piston end.

The bars 10 are conveniently obtained by pressing or moulding and are each formed with two lateral tapped holes receiving the screw-threaded ends of two rods 14 freely movable in holes 15 bored in the top cross-member 3. A helical spring 16 is interposed between the end of each rod 14 and lower face of the cross-member 3, said spring being coiled about the rod. The two springs 16 constantly tend to move the bar 10 downwardly, the rods 14 simultaneously guiding the bar in vertical direction when the piston 9 fixed to the bar is caused to move upwardly by the action of the oil pressure acting on the cup-shaped seal 12.

The top cross-member 3 is moreover provided in association with each bar 10 with two stops formed by the top ends of two screw-threaded rods 17 each screwed into a tapped hole formed in the cross-member 3. Lock nuts 18 hold the rods 17 in a position in which said rods extend more or less from the top face of the cross-member 3, whereby the starting position of the bars 10 may be adjusted.

Arrangement for operation as well as operation of the improved device shall now be described with reference to some examples. When bonding a sole to a man's shoe of the type denoted by 19 in Fig. 5, all the bars are utilized, the starting or return positions of the bar being set by the stops 17 which, as shown in said figure, are situated in positions such that the line connecting their ends extending beyond the cross-member 3 reproduces the ultimate longitudinal profile of the sole 20 to be glued to the footwear. The sole 20 rests on the pad which is made up in this instance by all the bars 10, the stops 21 and 22 being positioned for retaining the footwear. Pressure liquid supplied to the conduit 6 simultaneously lifts all the bars 10 which evenly press the sole 20 against the footwear 19, the pressure being uniform everywhere.

After maintaining pressure for a few moments as required for bonding the sole, pressure is relieved to enable removal of the shoe. This is made possible by the fact that the bars are each returned downwardly by their respective springs 16.

When dealing with a woman's shoe of the type denoted by 23 in Figure 6, part of the bars 10 are utilized for bonding th esole 24 at the region of the latter adapted to bear on the ground, a part of the remaining bars 10 being utilized for carrying a shaped body 25 adapted to bond said sole 24 at the arcuated region of the shoe and the rest of the bars 10 being held immobilized with short bolts 53 as described hereinafter and illustrated in Fig. 7. Stops 26, 27 and 28 hold the footwear during bonding of the sole.

According to a modification, the bars 10 instead of being rigidly connected to their respective pistons 9, can be connected thereto through a ball joint 29 in the manner shown in Figure 4. Moreover, the bars 10 can be provided all or in part with lateral stops 30 adapted to determine the position of the footwear sole with respect to the bars. As shown in Figure 4, the stops can be made adjustable in position in order to utilize them for bonding soles to shoes variable in type and size.

According to a further modification shown in Figures 7–12 the bars 31 are carried by pistons 34 through auxiliary bars 33. The auxiliary bars 33 (Figure 8) each freely bear on the top flat face of one of the pistons 34, which are each movably mounted in one of the cylinders formed by vertical bores 35 cut in the body of the device. The cylinders 35 are interconnected near the bottom thereof by coaxial holes 36 cut in the walls separating the various cylinders or vertical bores from the cylinders or contiguous vertical bores and forming together a longitudinal conduits similar to the conduit 6 shown in Figure 1. The auxiliary bars 33 are of such construction (Figures 9 and 10) that their periphery is made up at the bottom by a flat surface 37 for resting on their respective pistons and at the top by a cylindrical surface 38 designed for having the bar 31 bearing thereon. The auxiliary bars each moreover carry (Figure 8) a pair of vertical bolts 39 arranged on either side of the pistons 34, screwed into suitable tapped holes formed in the body of each bar 33 and provided at their lower end with a head which facilitates assembly and rechange. The bolts 39 extend through holes bored in the top cross-member 40 of the body of the device, thereby serving to guide the auxiliary bars 33 during movement of the pistons 34 and to limit the upward stroke of the pistons. The length of the stroke of each piston of course depends upon the length of the bolts secured to the auxiliary bar supported by the piston. Consequently, the lengths of the various bolt pairs are selected in accordance with the desired stroke length of the individual pistons 34. Finally, the auxiliary bars 33 (Figures 9 and 10) carry at their opposite ends cylindrical pins 41, the axis of which coincides with the axis of the cylindrical surface 38, the purpose thereof being explained hereinafter.

The bars 31 are preferably made straight of a rectangular cross-sectional shape (Figures 11 and 12). Forks 42 extend from their lower face 31' adapted to bear on one of the auxiliary bars 33 and are adapted to engage the pins 41 on the bars 34 when the bars 31 are superposed on the said bars 33.

This manner of assembly actually prevents any displacement of the bars 31 with respect to the auxiliary bars 33 in either a longitudinal or transverse direction, while it facilitates assembly and rechange and permits of oscillation of the bars 31 with respect to the auxiliary bars about the common axis of the cylindrical pins 41. This construction assists in suiting the bars 31 in shape of the sole to be attached to the footwear.

The top face of the bars 31 need not necessarily be flat, but can be formed with inclined lateral portions 43 (Figure 13) sloping towards the cross-middle plane of said bars.

The bars 31 can be simultaneously supported by more than one piston 34, however, always through the interposition of auxiliary bars 33. In such case the bars 31 may be of any of the constructions shown in Figures 14 to 16 and extend in width more or less beyond the forks 42 at one or both ends as illustrated by forks 42a and 42c.

The pistons 34 (Figure 7) are each formed with at least one peripheral groove 44 accommodating an annular seal of resilient material preferably an O-ring.

The inner compartments of the cylinders 35 interconnected by the holes 36 are partially filled with a liquid, preferably oil, through two holes closed by plugs 45 and are sealed by the latter.

All pistons 34, consequently also the auxiliary bars 33 and bars 31 are initially at the same level in such positions that the pistons upper ends extend somewhat beyond their respective cylinders.

In order to utilize the device for attaching a sole to a footwear, the device should be carried by a platform 46 capable of vertical movement under the action of a hydraulic jack 47 (Figure 7) or other equivalent mechanism, said platform 46 being brought beneath a last 48 on which the footwear 59, still without a sole, is fitted, and held in position by stops 50, 51 adjustably secured to a stationary frame (not shown).

The bars 31 which have been selected in the example shown in Figure 7 for reproducing the shape of the lower face of the sole 52 to be attached to the footwear 59 are not equal in length. It will be seen from said figure that the bars denoted by 31 are of the type shown in Figures 11 and 12, the bars denoted by 31a are of the type shown in Figure 14, the bars denoted by 31b are of the type shown in Figure 15, finally the bars denoted by 31c are of the type shown in Figure 16. The type of bar is selected as wil be obvious from Figure 7, depending upon the shape of the sole to be attached to the footwear and size thereof.

The number of pistons used for attaching a sole is variable too, depending upon the size of the sole. The pistons may be in part left inoperative during attachment of the sole, when lifting of said pistons is prevented by retaining their respective auxiliary bars by screwing into them very short bolts 53 which are substituted for bolts 39. Finally, it will be seen that the bars 31, instead of directly bearing on the sole to be attached to the footwear, may bear thereon through the interposition of one or a plurality of intermediate layers 54, which are preferably made of yieldable material.

The process of attaching the sole comprises the steps of retaining the footwear fitted on the last 49 in position, lifting the movable platform 46 by actuating the hydraulic jack 47. The bars 31, or the intermediate layer, carrying the sole are lifted as the platform rises to bring the sole into contact with the bottom of the footwear. Upon making contact, the pistons supporting the areas of initial contact are halted. The platform and cylinders continue to rise, the first halted pistons displace oil in their associated cylinders which flows through the cylinder interconnections to raise the free pistons in their respective cylinders until the whole sole is brought into contact with the lower portion of the footwear with the pressures in the cylinders and exerted by the pistons being the same.

Starting from this position the sole is evenly pressed throughout its surface against the lower portion of the footwear long enough for attachment by further lifting of the movable platform 46.

Subsequently, the platform 46 is lowered, the footwear having the sole attached thereto being removed from the last for undergoing further finishing operations.

The device carried by the movable platform maintains upon attachment of the first sole the movable pistons 34, bars 31 and 33 and intermediate bodies in the position they have taken during the first bonding and pressing process of the sole to the lower portion of the footwear fitted on the last. This is due to passive frictional resistances which oppose sliding of the pistons 34 in the cylinders 35, thereby facilitating and simplifying subsequent processes of attaching soles of the same size to shoes which are sequentially fitted on the last 48.

What I claim is:

1. A device for horizontally supporting and pressing soles having a vertical profile to footwear that are held on stops, said device comprising; a number of cross-bars arranged side by side and parallel with one another, the cross-bars being of uniform thickness, as long as the widest sole and sufficiently numerous for the sum of the cross-bar widths to equal the length of the longest sole; a body having a lower and a top cross-member connected by an intermediate rib; a row of vertical cylinders bored in the top cross-member and extending into the rib, said cylinders being interconnected; pistons of the plunger type slidable in the cylinders and projecting therefrom to support the cross-bars; means connecting said cylinders with a pressure-liquid delivery conduit for exerting pressure on and displacing the pistons in the cylinders, and with a back-flow conduit for releasing the liquid in said cylinders and the pressure on the pistons, said cross-bars being displaced with the pistons; means for guiding and limiting the upward movement of the piston-displaced cross-bars supporting a sole, said means for guiding and limiting including means for locking non-supporting cross-bars to the top cross-member; and stop means for setting the vertical starting positions of the sole-supporting cross-bars in accordance with the vertical profile of the horizontally supported sole.

2. A device as claimed in claim 1 wherein said stop means for setting the vertical starting position of each cross-bar comprises a pair of screw bolts screwed in tapped holes bored through the top cross-member adjacent the ends of each said cross-bar, whereby said bolts are adjustable by rotation in the tapped holes to extend beyond the top cross-member to contact the associated cross-bar and to stop said cross-bar at the desired vertical starting position.

3. A device for pressing soles on supported footwear to form shoes, said device comprising; a plurality of cross bars for supporting a sole, said bars being as long as the widest of said soles and transversely arranged with respect to a sole in sufficient number to extend for at least the length of the longest of said soles, and a body having a lower and a top cross-member connected by an intermediate rib; a plurality of cylinders bored in the top cross-member and extending into the rib, said cylinders being interconnected by a passageway and chargeable therewith with a liquid; pistons of the plunger type slidable in the cylinders and projecting in elevation therefrom to support the cross-bars; means for exerting pressure on said liquid to displace the pistons and cross-bars; and means for guiding said cross-bars in their displacement.

4. Device as claimed in claim 3, wherein auxiliary bars are provided, one for each piston, said auxiliary bars being interposed between the piston and a cross-bar bearing thereon.

5. Device as claimed in claim 3, wherein auxiliary bars are provided, one for each piston, said auxiliary bars having a lower flat surface for contacting the piston and an upper cylindrical surface for supporting a superimposed cross-bar, cylindrical pins coaxial with said cylindrical upper surface at opposed ends of each auxiliary bar and aligned forks extending from the lower face at opposed ends of each cross-bar for engaging the said cylindrical pins on one of said auxiliary bars, and a pair of bolts secured near the opposed ends of each auxiliary bar depending therefrom and extending through holes bored in the top cross-member of said body for guiding said auxiliary and cross-bars during the piston displacements and for limiting their upward stroke.

6. Device as claimed in claim 3, wherein said cross-bars have top faces of a longitudinal shape comprising an intermediate horizontal portion and two lateral portions inclined towards the cross-middle plane of the bar.

7. A device as claimed in claim 3 wherein said means for guiding the movement of said piston-displaced cross-bars supporting a sole comprises; a pair of bolts secured to each cross-bar one bolt on each side of said rib and depending from said cross-bar, said bolts extending through holes bored in the top cross-member of the body; a helical spring positioned between the top cross-member and the end of each bolt remote from said cross-bar for restoring the starting position of each cross-bar when the liquid pressure on the pistons is released.

References Cited in the file of this patent

UNITED STATES PATENTS

| 930,272 | Davenport | Aug. 3, 1909 |
| 942,133 | Davenport | Dec. 7, 1909 |

FOREIGN PATENTS

| 356,685 | Germany | July 21, 1922 |
| 639,696 | Great Britain | July 5, 1950 |
| 782,414 | Great Britain | Sept. 4, 1957 |